(12) United States Patent
Nobis

(10) Patent No.: US 9,696,536 B2
(45) Date of Patent: Jul. 4, 2017

(54) ARRANGEMENT FOR CHANGING THE FOCUS OF A MICROSCOPE OBJECTIVE

(71) Applicant: Carl Zeiss Microscopy GmbH, Jena (DE)

(72) Inventor: Thomas Nobis, Jena (DE)

(73) Assignee: Carl Zeiss Microscopy GmbH, Jena (DE)

(*) Notice: Subject to any disclaimer, the term of this patent is extended or adjusted under 35 U.S.C. 154(b) by 0 days.

(21) Appl. No.: 15/009,195

(22) Filed: Jan. 28, 2016

(65) Prior Publication Data

US 2016/0216499 A1 Jul. 28, 2016

(30) Foreign Application Priority Data

Jan. 28, 2015 (DE) .................. 10 2015 201 393

(51) Int. Cl.
*G02B 21/00* (2006.01)
*G02B 21/02* (2006.01)
*G02B 21/33* (2006.01)

(52) U.S. Cl.
CPC .............. *G02B 21/02* (2013.01); *G02B 21/33* (2013.01)

(58) Field of Classification Search
CPC .. G02B 21/241; G02B 21/242; G02B 21/025; G02B 21/248; A61B 5/0059; A61B 10/0012; A61B 2010/0025; A61B 2503/40; A61B 3/13; A61B 3/14; A61B 90/20; A61B 10/0051; A61B 10/007; A61B 1/313; A61B 2010/0016; A61B 2010/0074; A61B 3/1015; A61B 3/113
See application file for complete search history.

(56) References Cited

U.S. PATENT DOCUMENTS

2013/0141629 A1* 6/2013 Yoshinaga .............. G02B 7/08
348/345

OTHER PUBLICATIONS

German Search Report for Application No. 10 2015 201 393.6, mailed Sep. 23, 2015, including English language translation (14 pgs total).

* cited by examiner

*Primary Examiner* — Scott J Sugarman
*Assistant Examiner* — Sharrief Broome
(74) *Attorney, Agent, or Firm* — Patterson Thuente Pederson, P.A.

(57) ABSTRACT

A plan apochromat corrected microscope objective including multiple subsystems with optical components and/or component groups, wherein an optical component or a component group can move axially in the interior of the microscope objective. The axially movable component or the component group includes a concave-convex lens or lens group oriented toward the object plane, with a form factor of:

$$X = \frac{c_1 + c_2}{c_1 - c_2}$$

wherein X is the form factor, $c_1$ is the curvature of the surface oriented in the direction of the object plane, and $c_2$ is the curvature of the surface oriented in the direction of the image plane, of the axially movable lens or lens group, X lying within a range from $-8 < X \leq -1$.

8 Claims, 10 Drawing Sheets

ARRANGEMENT FOR CHANGING THE FOCUS OF A MICROSCOPE OBJECTIVE

RELATED APPLICATIONS

The present application claims priority to German Application No. 102015201393.6, filed Jan. 28, 2015, said application being incorporated herein in its entirety by reference.

TECHNICAL FIELD

The invention relates to an arrangement for changing the focus of a microscope objective, particularly a plan apochromat corrected microscope objective which is composed of multiple subsystems comprising optical components and/or component groups, wherein at least one optical component or one component group can also move axially in the interior of the microscope objective.

BACKGROUND

In modern, wide-field and/or laser-scanning microscopy with biological or other samples, it is essential that optical planes at different sample depths (z stacks) are quickly captured at a high numerical aperture (NA>0.8 with water immersion).

There are various different solutions for changing the focus in the known prior art. One of the solutions is the movement of the entire microscope objective. This method transmits vibrations to the sample if an immersion medium is used, such as water or oil, for example. In addition, the speed which can be achieved is limited by the high mass of the microscope objective.

The use of adaptive elements for changing the focus is also known. In this case, it is disadvantageous that it is necessary to insert an additional optical arrangement into the beam path to constitute the pupil. This is also very unwieldy.

Moreover, it is not possible to correct field aberrations in wide-field microscopy, such that the focal range of this solution is very restricted.

Another known solution is a movement of lenses in the tube optics used. Because of the low numerical aperture in the tube optics and the resulting low depth imaging factor, long movement paths are necessary in this configuration. In addition, aberrations arising on the lenses close to the object due to defocus are difficult or sometimes even impossible to correct at high numerical apertures.

In addition, a solution is known in which "Alvarez elements" are used for changing the focus. These are specially ground plates which generate a focal shift when moved toward each other. A dedicated access to the pupil is also necessary in this case. This positioning can be achieved in the objective due to the Alvarez plates functioning in the transmission path. However, this increases the technical complexity of the microscope objective significantly.

The typical approach for photographic objectives of moving lenses axially in the inside of the objective has led in the past to relatively little success. Due to the high numerical aperture, as well as the wide angle of incident light rays at the edge of the objective, strong aberrations are typically produced—in addition to a focal shift—when the lenses are moved. To correct these, a movement of additional lenses is necessary.

For this reason, in typical correction objectives with a long movement path, multiple lenses are typically moved. However, these coupled movements cannot be carried out very quickly.

By way of example, DE 102005034441A1 describes a microscope objective having an optical frontal element, multiple optical elements which are spaced apart from the frontal element and from each other, and an adjusting device, wherein at least one of the optical elements can be moved along the optical axis by means of the adjusting device in such a manner that the position of the focus of the objective is displaced relative to the frontal element in the direction of the optical axis and/or an aberration of the objective caused by temperature is compensated.

In this solution, the action of focusing at a high numerical aperture is carried out with movable elements. In this case, a diffractive element is moved. A substantial disadvantage in this case is that light is scattered by diffraction at other orders than the functional order.

Proceeding from the solutions according to the prior art, the problem addressed by the invention is that of further advancing an arrangement for focusing a microscope objective, in such a manner that it is possible to quickly change the focus, using simple means, over a relatively large focal range while avoiding vibrations and aberrations.

SUMMARY

This problem is addressed by an arrangement of the type described above.

According to embodiments of the invention, the axially movable component or the component group consists of a concave-convex (crescent-shaped) lens or lens group oriented toward the object plane, with a form factor of:

$$X = \frac{c_1 + c_2}{c_1 - c_2}$$

wherein X is the form factor, $c_1$ is the curvature of the surface oriented in the direction of the object plane, and $c_2$ is the curvature of the surface oriented in the direction of the image plane, of the axially movable lens or lens group, and wherein X lies within a range from $-8 < X < -1$.

Because the focus change is carried out in the interior of the microscope objective, vibrations are avoided. Due to the relatively low mass of a single lens or lens group, it is possible to quickly change the focus with a comparatively large focal shift (more than 100 focal depths).

In this configuration, the image quality, as regards axial aberration, spherical aberration, and field aberration, is preserved.

The specially shaped, axially movable single lens or lens group in this case is arranged, proceeding from the object plane, behind a first optical component or a component group, called the frontal group. The total focal length $f_{front}$ of the frontal group, relative to the focal length of the objective $f_{objective}$ lies in the range of:

$$f_{front} < -4 \times f_{objective} \text{ or } f_{front} > 4 \times f_{objective}$$

and the focal length of the movable single lens or lens group, for an axial range of travel between approximately 0 mm and 5 mm, is within the range of:

$$3 \times f_{objective} < f_{ShiftLens} < 20 \times f_{objective}.$$

Both the frontal group and the component which is arranged with axial movement for the purpose of changing the focus can in this case either consist of a single lens, a double lens component, or a triple lens component. Combinations of two of these elements can also be contemplated.

If the focal length is made too large, the sensitivity for the change of focus is lowered, which means that the lens or lens group must be moved unreasonably far to ensure a change of focus in the sample. If, in contrast, the focal length is made too small, the lens movement generally produces distortions.

Within the ranges named above, depending on the type of objective, the form factor and focal length (two degrees of freedom) are selected such that no spherical aberration occurs on the axis and no coma occurs on the edge of the field during the movement (two requirements). For the selected lens, there is usually an existing solution at multiple positions in the objective to fulfill both requirements in the two degrees of freedom available.

Due to the position of the arrangement of the axially movable single lens or lens group, the astigmatism on the edge of the field is minimized over the focal range. The specially designed concave-convex shape (crescent shape) is also beneficial for the imaging properties of the objective when the single lens or lens group is unadvanced, because it has an essentially aplanatic shape.

In addition, the selection of the moved single lens or lens group in the frontal region of the objective leads to an early compensation of the beam path changed by the change of focus. Light passes through the rear portion of the objective in a similar manner for all focus positions. The result is fewer induced aberrations.

A further effect when the arrangement according to the invention is used is a special color correction. If a single lens is used as the movable component, the Abbe coefficient/ dispersion of the material is selected according to the invention in such a manner that no axial aberration occurs during the movement, in cooperation with the color properties of the frontal and rear groups. Because this can happen regardless of the selection of the refractive index of the glass for the primary wavelengths, the properties of the correction mentioned above are not changed. If no glass is available for this purpose, the relevant Abbe coefficient can be produced via a lens component.

The arrangement according to the invention for the change of focus can be used with positive results in, by way of example, 25×/0.8 W, 25×/0.9 W, and 20×/1.0 W microscope objectives, although other designs can be contemplated.

In this case, the arrangement can be integrated in already existing microscope objectives with a fixed focal length, with minimal modifications.

Furthermore, the arrangement according to the invention is elevated above the prior art to the following extent:

The two air spaces before and after the axially movable single lens or lens group are generally used in a fixed focus objective for adjustment procedures. This means that spherical aberration on the axis is adjusted one time, wherein both air spaces are lengthened simultaneously. By moving the single lens or lens group—that is, by reducing one of the two air spaces and enlarging the other air space, the axial aberration on the axis is typically adjusted one time.

This adjustment is intentionally modified in the arrangement according to the invention. A correction mechanism is included which enables a cover glass thickness correction and therefore can also be used for adjusting the spherical aberration. The axial aberration, in contrast, can be adjusted simply by changing the distance between the frontal and rear group, as a result of the correction named above. The air spaces before and after the axially movable single lens or lens group are specifically enlarged. Objectives in the prior art use very closely spaced lenses in the frontal objective part, which contribute to the rapid reduction in the angle of incidence of light on the lens surfaces, as well as to the reduction in the objective diameter. This was specifically circumvented in the arrangement according to the invention in order to create more space for the lens movement.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
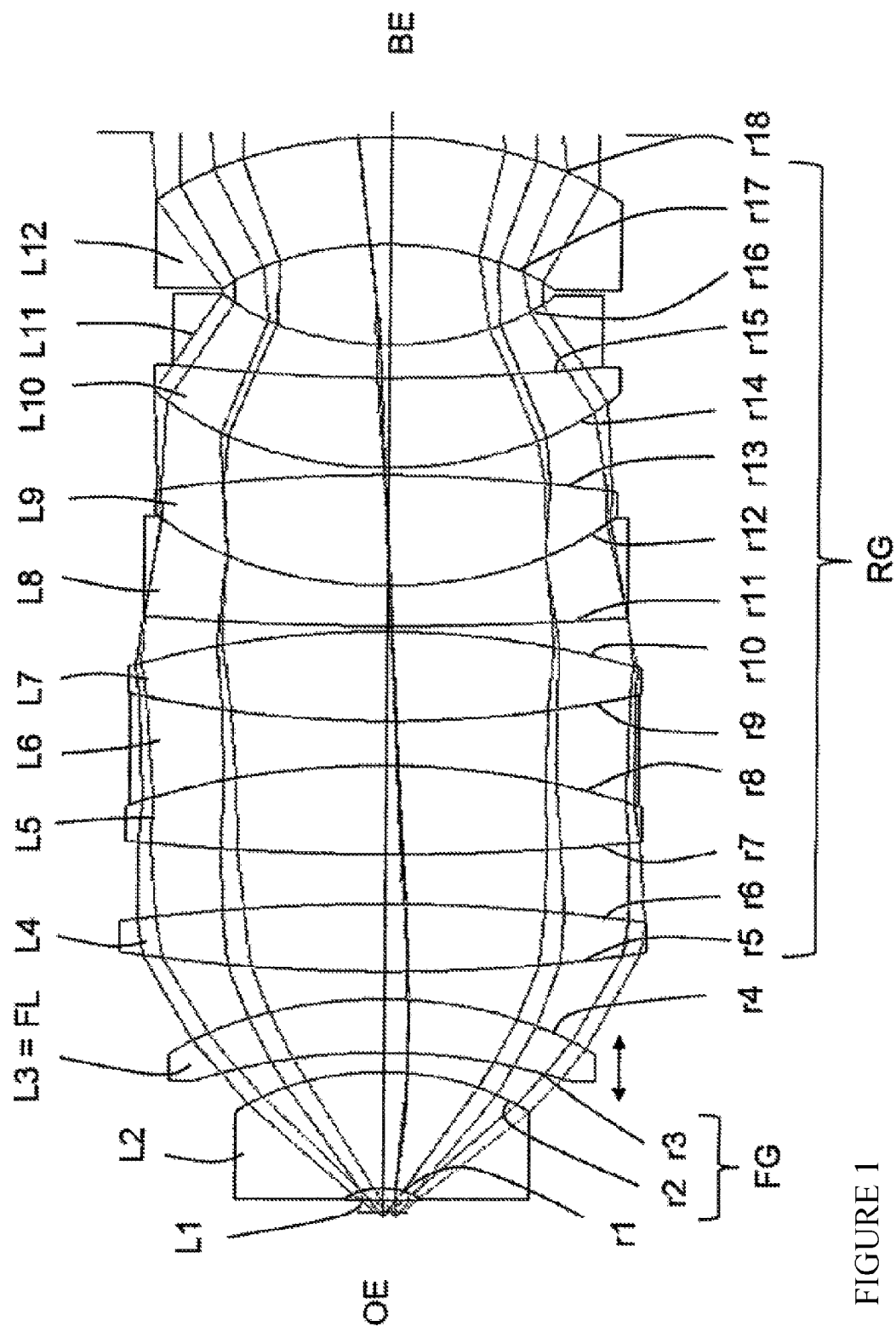
FIG. 1 shows a schematic illustration of the single lens of the arrangement according to the invention, with the curvature radii in a plan-apochromat 25×/0.9 W for a focal range of 200 μm.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

FIG. 1 shows the arrangement according to the invention in a plan apochromat 25×/0.9 W for a focal range of 200 μm.

Proceeding from the object plane OE, the arrangement consists of a frontal group FG, having lenses L1 and L2, an axially movable lens L3 designed as the focus lens FL, and a rear group RG with the lenses L4 to L12. FIG. 1 also shows the radii r1 to r18 of the individual optical components.

Figure 2:
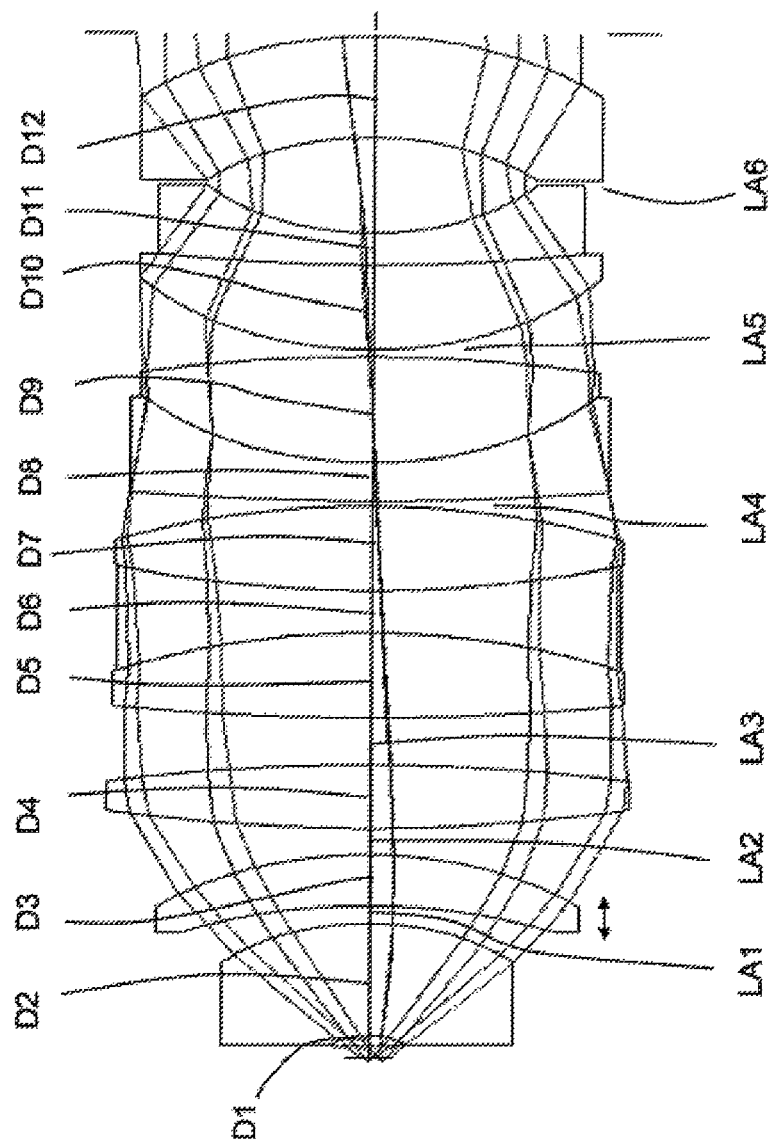
FIG. 2 shows a schematic illustration of the thicknesses of the single lenses in FIG. 1, as well as the air spaces.

The schematic illustration of the arrangement according to the invention in FIG. 2 complements the illustration in FIG. 1 by adding the thicknesses D1 to D12 of the lenses 11 to [L12], and the air spaces LA1 to LA6.

Because of the axial movement of the concave-convex (crescent-shaped) lens 2—that is, of the focus lens [FL]—in combination with the form factor X thereof, which is:

$$X = \frac{c_1 + c_2}{c_1 - c_2}$$

wherein $c_1$ is the curvature of the surface oriented in the direction of the object plane, and $c_2$ is the curvature of the surface oriented in the direction of the image plane, of the axially movable lens or lens group, and wherein X lies within a range from $-8 < X < -1$, the plan apochromat lens can be focused quickly with no vibration.

For a focal range of 200 μm, a numerical aperture of 0.9, a magnification factor β with a 25× larger image, and when an immersion agent/sodium chloride solution W is used, with a field number of 18, this embodiment is characterized by the following design data, wherein r1 to r18 are the curvature radii of the optical components in mm, D is the thickness of the air spaces between the optical components in mm, LA1 to LA6 are the air spaces between the optical components in mm, $n_e$ is the refractive index, and $v_e$ is the Abbe coefficient:

| Lens No. | Curvature radius R [mm] | Size Air space D, LA [mm] | Refractive Index $n_e$ | Abbe Co-efficient $v_e$ |
|---|---|---|---|---|
| Sample, cell medium | flat | P | 1.38 | 63.0 |
| Cover glass | flat | DG | 1.53 | 54.3 |
| Immersion | flat | AA | 1.34 | 55.4 |
| 1 | flat | D1 0.50 | 1.49 | 70.2 |
| 2 | r1 −1.636 | D2 5.79 | 1.89 | 40.5 |
|   | r2 −6.167 | LA1 |  |  |
| 3 | r3 −14.549 | D3 2.40 | 1.59 | 61.0 |
|   | r4 −9.422 | LA2 |  |  |
| 4 | r5 70.312 | D4 3.00 | 1.81 | 46.2 |
|   | r6 −22.736 | LA3 |  |  |
| 5 | r7 42.712 | D5 3.80 | 1.49 | 84.1 |
| 6 | r8 −18.905 | D6 1.60 | 1.66 | 39.5 |
| 7 | r9 13.868 | D7 3.90 | 1.50 | 81.1 |
|   | r10 −18.518 | LA4 |  |  |
| 8 | r11 −344.203 | D8 1.40 | 1.64 | 42.2 |
| 9 | r12 8.092 | D9 5.04 | 1.53 | 76.6 |
|   | r13 −48.460 | LA5 0.35 |  |  |
| 10 | r14 8.015 | D10 3.80 | 1.59 | 61.0 |
| 11 | r15 11.802 | D11 1.40 | 1.72 | 53.6 |
|   | r16 5.902 | LA6 5.14 |  |  |
| 12 | r17 −6.704 | D12 4.69 | 1.81 | 46.2 |
|   | r18 −9.177 | 0.13 |  |  |
|   |  | 126.50 |  |  | and a tube lens arranged behind the same, with a focal length of f=164 mm.

Depending on the sample thickness P, the cover glass DE which is used, and the working distances AA, the following values are then found for the air spaces LA1 to LA4. The air spaces LA5 and LA6 are always the same in this case.

| P [mm] | DG [mm] | AA [mm] | LA1 [mm] | LA2 [mm] | LA3 [mm] | LA4 [mm] |
|---|---|---|---|---|---|---|
| 0 | 0 | 0.56 | 1.78 | 0.49 | 2.47 | 0.3 |
| 0.2 | 0 | 0.56 | 0.95 | 1.33 | 2.47 | 0.3 |
| 0 | 0.17 | 0.4 | 1.78 | 0.49 | 1.93 | 0.84 |
| 0.2 | 0.17 | 0.4 | 0.95 | 1.33 | 1.93 | 0.84 |

Figure 3:
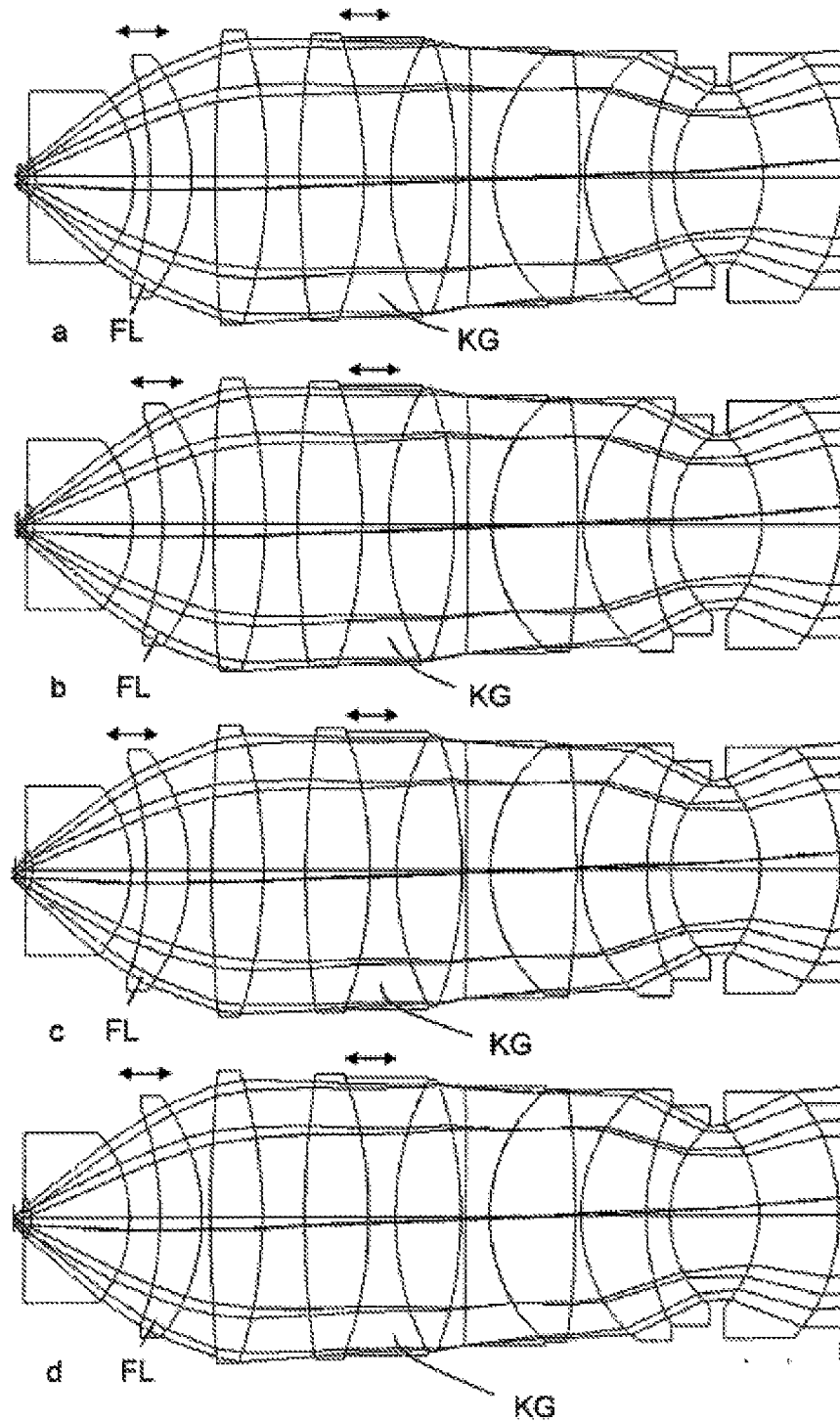
FIG. 3 shows schematic illustrations of the arrangement according to the invention in FIG. 1, for various configurations.

FIG. 3 shows schematic illustrations of the arrangement according to the invention for different configurations, with the axially movable focus lens and an axially movable lens component for a correction mechanism:

a: with a cover glass and a long working distance, b: with a cover glass and a short working distance, c: without a cover glass and with a long working distance, d: without a cover glass and with a short working distance.

The configurations with a long working distance refer to a focus shift into deep regions of the sample medium. The configurations with a short working distance have a focus position at a shallow sample depth. They only differ by the position of the focus lens. By an additional movement of the correction mechanism, further configurations with a cover glass and without a cover glass are possible. The correction mechanism is not moved for the focusing.

Figure 4:
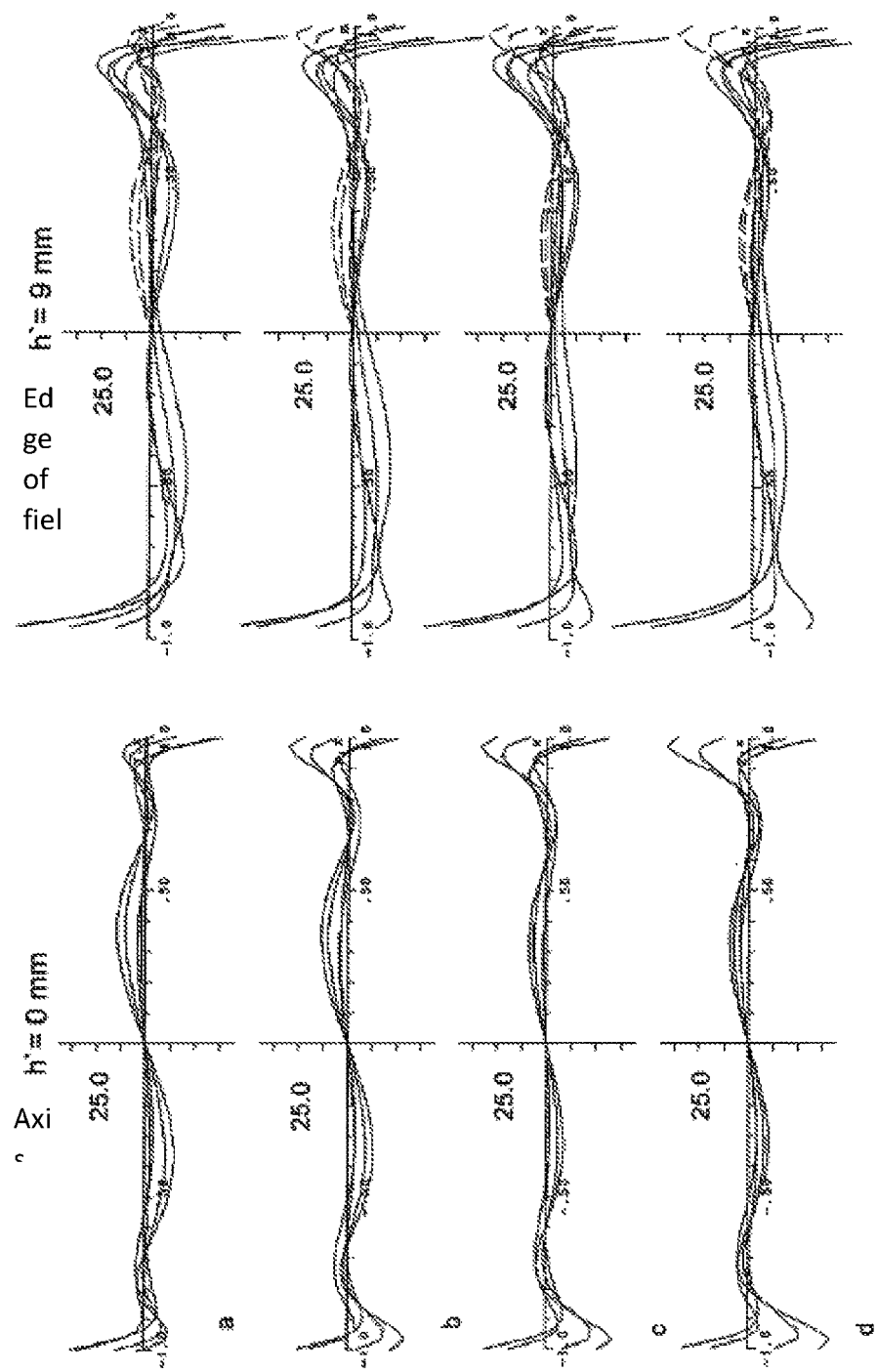
FIG. 4 shows schematic illustrations of transverse aberrations of the arrangement in FIG. 1.

FIG. 4 illustrates transverse aberrations in μm for an axis point h'=0 mm and for a field edge point h'=9 mm, using light of the wavelengths 546 nm, 644 nm, 480 nm and 830 nm for the various configurations a, b, c, and d in FIG. 3. Continuous lines refer to the meridional section, and dashed lines to the sagittal section.

The individual aberration curves only differ to a very small degree. This shows that, according to the invention, neither the correction mechanism nor the focusing movement has a noticeable influence on the image quality.

Figure 5:
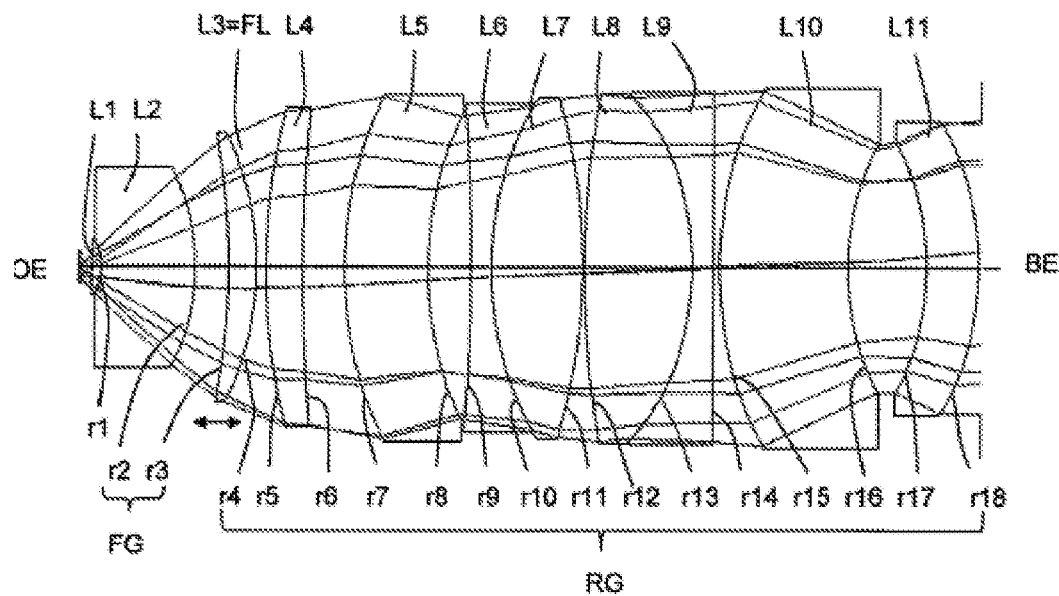
FIG. 5 shows a schematic illustration of the single lenses of the arrangement according to the invention, with the curvature radii in a plan apochromat 25×/0.8 W for a focal range of 250 μm in an objective modification known from U.S. Pat. No. 7,782,539.

FIG. 5 shows the arrangement according to the invention in a plan apochromat 25×/0.8 W for a focal range of 250 μm in an objective modification known from U.S. Pat. No. 7,782,539.

Proceeding from the object plane OE, the arrangement consists of a frontal group FG, having the lenses L1 and L2, an axially movable lens L3 designed as a focus lens FL, and a rear group RG with the lenses L4 to L11. The figure also shows the radii r1 to r17 of the individual optical components.

Figure 6:
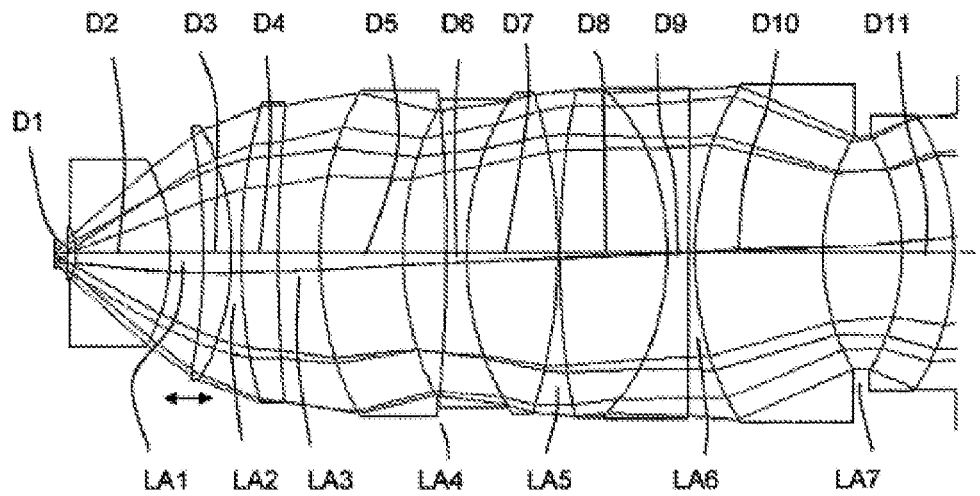
FIG. 6 shows a schematic illustration of the thicknesses of the single lenses according to FIG. 5, as well as the air spaces.

The schematic illustration of the arrangement according to the invention in FIG. 6 complements the illustration in FIG. 5 by adding the thicknesses D1 to D11 of the lenses L1 to L11, as well as the air spaces LA1 to LA7.

For a focal range of 250 μm, a numerical aperture of 0.8, a magnification factor β with a 25× larger image, and when an immersion agent/sodium chloride solution W is used, with a field number of 18, this embodiment is characterized by the following design data, wherein r1 to r17 are the curvature radii of the optical components in mm, D is the thickness of the air spaces between the optical components in mm, LA1 to LA7 are the air spaces between the optical components in mm, $n_e$ is the refractive index, and $v_e$ is the Abbe coefficient:

| Lens No. | Curvature radius [mm] | Size [mm] | Refractive index $n_e$ | Abbe coefficient $v_e$ |
|---|---|---|---|---|
| Sample, water | flat | P | 1.33 | 55.8 |
| Cover glass | flat | 017 | 1.52 | 59.2 |
| immersion | flat | 060 | 1.33 | 55.8 |
| 1 | flat | D1 0.50 | 1.49 | 70.2 |
| 2 | r1 −1.654 | D2 4.99 | 1.89 | 40.5 |
|   | r2 −5.733 | LA1 |   |   |
| 3 | r3 −16.879 | D3 1.50 | 1.52 | 64.0 |
|   | r4 −7.899 | LA2 |   |   |
| 4 | r5 15.656 | D4 2.00 | 1.59 | 68.0 |
|   | r6 34.321 | LA3 1.65 |   |   |
| 5 | r7 10.519 | D5 4.50 | 1.55 | 45.5 |
|   | r8 9.906 | LA4 2.30 |   |   |
| 6 | r9 −43.509 | D6 1.10 | 1.64 | 42.2 |
| 7 | r10 9.045 | D7 5.00 | 1.53 | 76.6 |
|   | r11 −13.679 | LA5 0.10 |   |   |
| 8 | r12 23.291 | D8 5.80 | 1.53 | 76.6 |
| 9 | r13 −7.743 | D9 1.10 | 1.62 | 44.3 |
|   | r14 393.143 | LA6 0.36 |   |   |
| 10 | r15 10.029 | D10 6.85 | 1.82 | 46.4 |
|   | r16 6.941 | LA7 4.20 |   |   |
| 11 | r17 −6.809 | D11 2.83 | 1.60 | 35.0 |
|   | r18 −7.687 | 0.15 |   |   |
|   |   | 126.50 |   |   | and a tube lens arranged behind the arrangement, the tube lens having a focal length of f=164.5 mm.

Depending on the sample thickness P, the cover glasses DE which are used, and the working distances AA, the following values are then found for the air spaces LA1 to LA2:

| P [mm] | LA1 [mm] | LA2 [mm] |
|---|---|---|
| 0 | 1.42 | 1.19 |
| 0.25 | 0.50 | 2.11 |

The air spaces LA3 and LA7 are always the same in this case.

Figure 7:
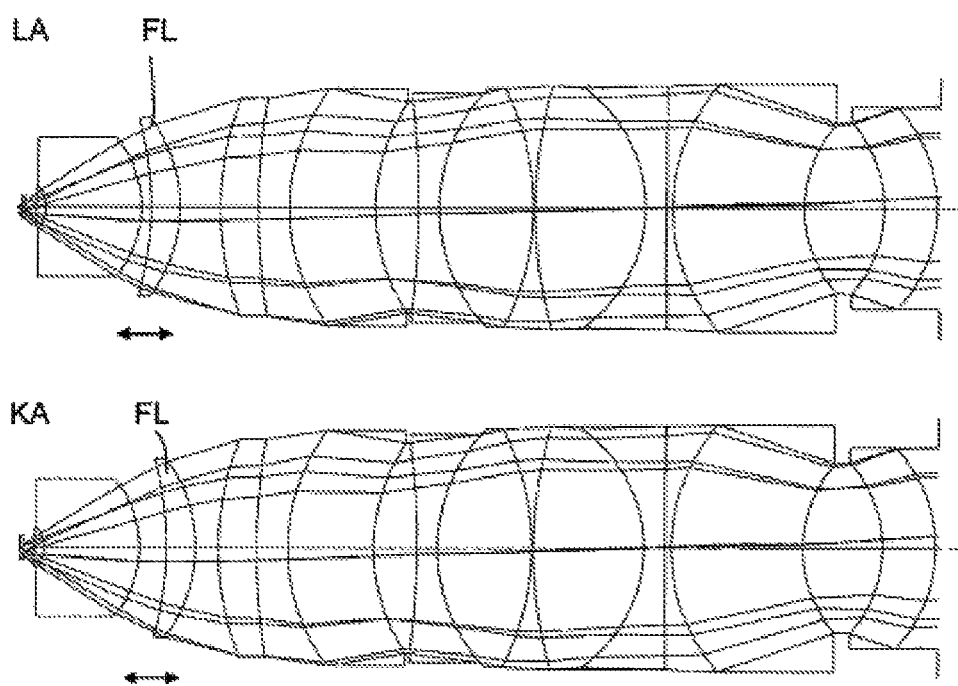
FIG. 7 shows schematic illustrations of the arrangement according to the invention in FIG. 5, for various focal depths in the sample.

FIG. 7 shows schematic illustrations of the arrangement according to FIG. 5 for various focal depths in the sample, with a long working distance LA and a short working distance KA, and the axially movable focus lens FL.

Figure 8:
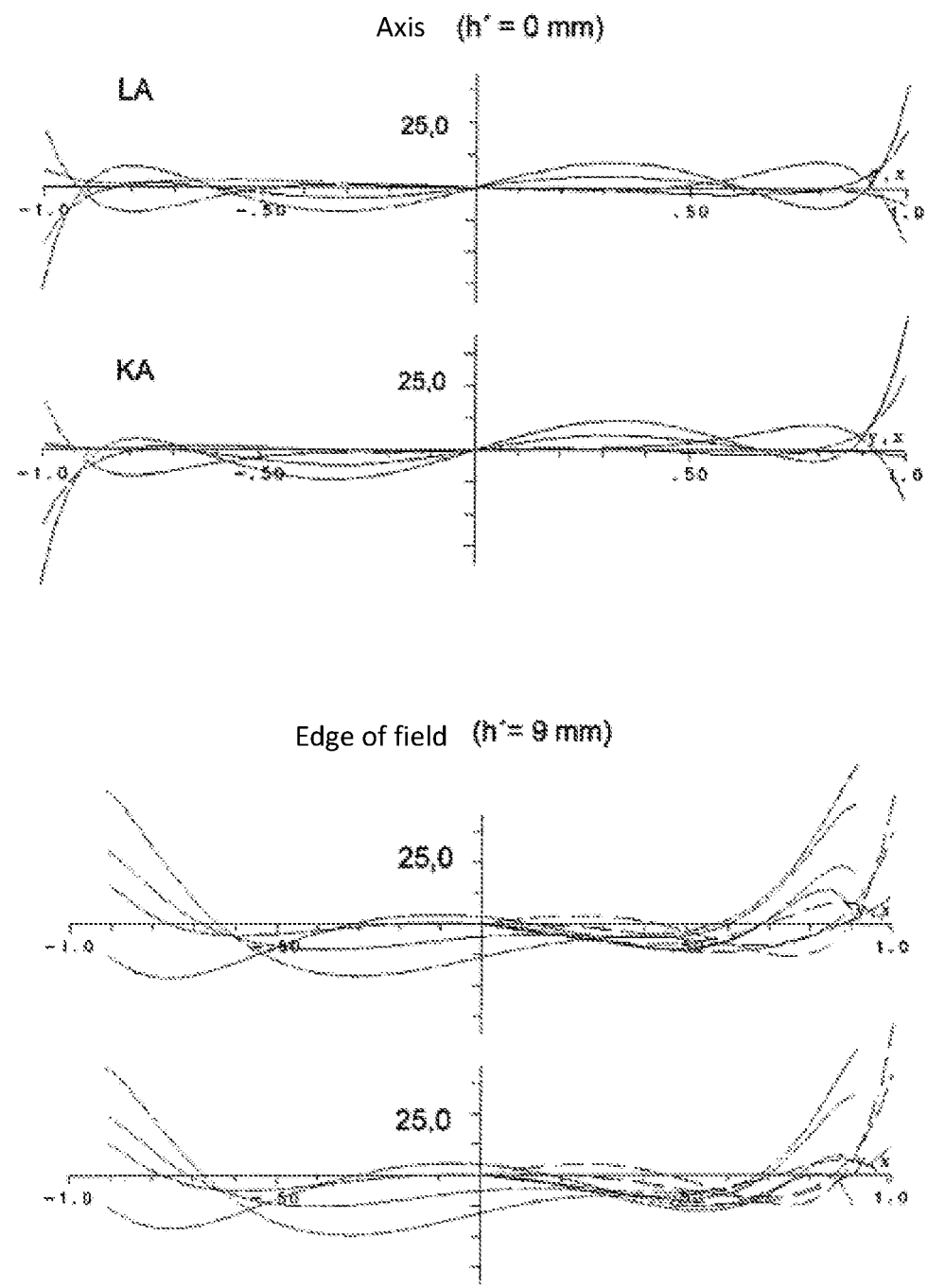
FIG. 8 shows schematic illustrations of transverse aberrations of the arrangement in FIG. 5.

FIG. 8 shows transverse aberrations in μm for an axis point h'=0 mm and for a field edge point h'=9 mm, using light of the wavelengths 546 nm, 644 nm, 480 nm and 830 nm for the various working distances LA and KA. Continuous lines refer to the meridional section, and dashed lines to the sagittal section.

Once again, the minimum changes in the aberration curves show the inventive function of the focusing arrangement at a constant image quality.

Figure 9:
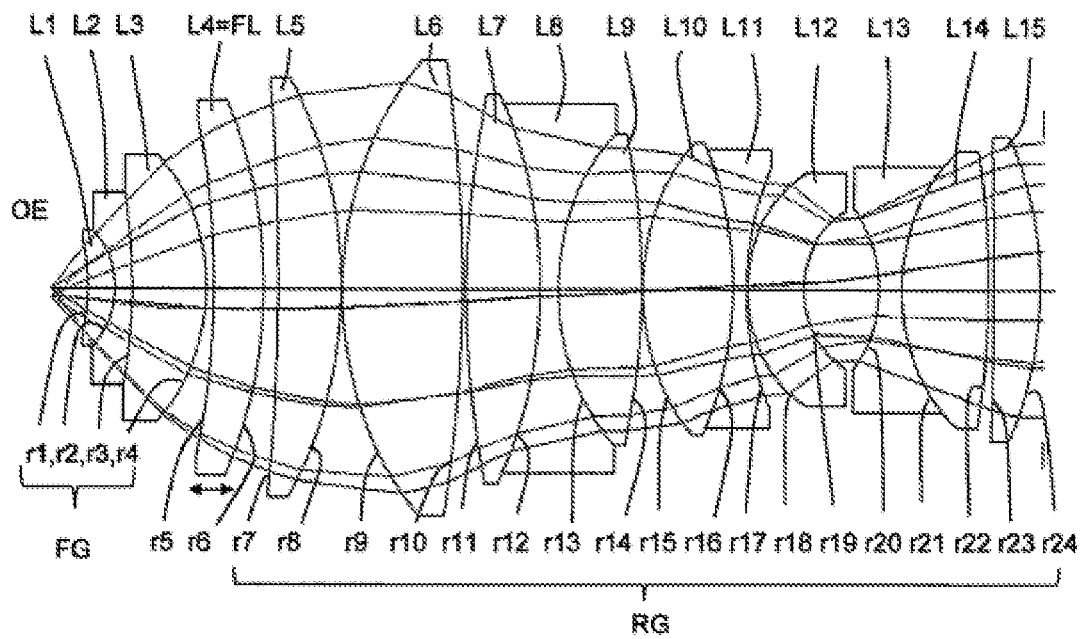
FIG. 9 shows a schematic illustration of the single lenses of the arrangement according to the invention, with the curvature radii in a plan apochromat 20×/1.0 W for a focal range of 300 μm in an objective modification known from DE 102011109783.

FIG. 9 shows the arrangement according to the invention in a plan apochromat 20×/1.0 W for a focal range of 300 μm in an objective modification known from DE 102011109783.

Proceeding from the object plane OE, the arrangement consists of a frontal group FG, having the lenses L1, L2, and L3, an axially movable lens L4 designed as a focus lens FL, and a rear group RG with the lenses L5 to L15. The figure also shows the radii r1 to r24 of the individual optical components.

Figure 10:
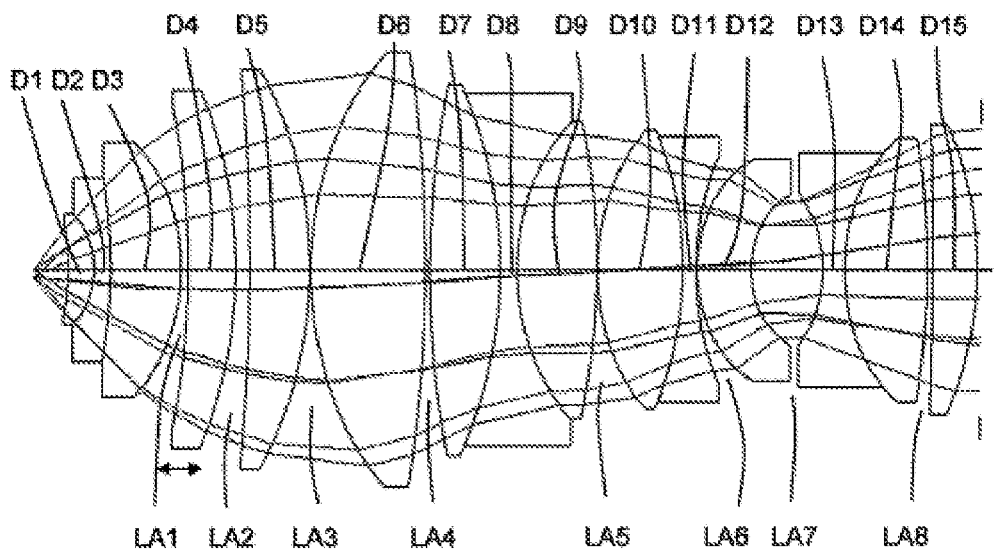
FIG. 10 shows a schematic illustration of the thicknesses of the single lenses in FIG. 9, as well as the air spaces.

The schematic illustration of the arrangement according to the invention in FIG. 10 complements the illustration in FIG. 9 by adding the thicknesses D1 to D15 of the lenses L1 to L15, as well as the air spaces LA1 to LA8.

For a focal range of 300 μm, a numerical aperture of 1.0, a magnification factor β with a 20× larger image, an immersion agent/sodium chloride solution W, and a field number of 20, this embodiment is characterized by the following design data, wherein r1 to r24 are the curvature radii of the optical components in mm, D is the thickness of the air spaces between the optical components in mm, LA1 to LA8 are the air spaces between the optical components in mm, $n_e$ is the refractive index, and $v_e$ is the Abbe coefficient:

| Lens No. | Curvature radius [mm] | Size [mm] | Refractive index $n_e$ | Abbe coefficient $v_e$ |
|---|---|---|---|---|
| Sample, water | flat | P | 1.34 | 55.4 |
| immersion | flat | 2.62 | 1.34 | 55.4 |
| 1 | r1 −11.117 | D1 2.20 | 1.63 | 53.0 |
| 2 | r2 −3.919 | D2 1.41 | 1.76 | 52.1 |
| 3 | r3 −21.906 | D3 6.00 | 1.89 | 40.5 |
|   | r4 −10.061 | LA1 |   |   |
| 4 | r5 −41.589 | D4 4.00 | 1.73 | 28.3 |
|   | r6 −24.293 | LA2 |   |   |
| 5 | r7 −104.081 | D5 5.00 | 1.44 | 94.5 |
|   | r8 −21.109 | LA3 0.10 |   |   |
| 6 | r9 18.565 | D6 9.65 | 1.44 | 94.5 |
|   | r10 −72.224 | LA4 0.37 |   |   |
| 7 | r11 60.934 | D7 6.00 | 1.44 | 94.5 |
| 8 | r12 −22.685 | D8 1.50 | 1.75 | 35.1 |
| 9 | r13 12.541 | D9 6.79 | 1.44 | 94.5 |
|   | r14 −36.716 | LA5 0.10 |   |   |
| 10 | r15 12.363 | D10 7.20 | 1.44 | 94.5 |
| 11 | r16 −19.563 | D11 1.10 | 1.64 | 42.4 |
|   | r17 20.125 | LA6 0.10 |   |   |
| 12 | r18 7.723 | D12 4.50 | 1.82 | 46.4 |
|   | r19 5.002 | LA7 6.00 |   |   |
| 13 | r20 −6.689 | D13 1.90 | 1.52 | 52.1 |
| 14 | r2 19.342 | D14 7.07 | 1.53 | 76.6 |
|   | r22 −57.991 | LA8 0.45 |   |   |
| 15 | r23 −455.522 | D15 3.80 | 1.75 | 35.0 |
|   | r24 −18.748 | 0.29 |   |   |
|   |   | 107.00 |   |   | and a tube lens is arranged behind the arrangement, the tube lens having a focal length of f=164.5 mm.

Depending on the sample thickness P, the cover glasses DE which are used, and the working distances AA, the following values are then found for the air spaces LA1 to LA2:

| P [mm] | LA1 [mm] | LA2 [mm] |
|---|---|---|
| 0 | 1.8 | 0 |
| 0.29 | 0 | 1.8 |

The air spaces LA3 and LA8 are always the same in this case.

Figure 11:
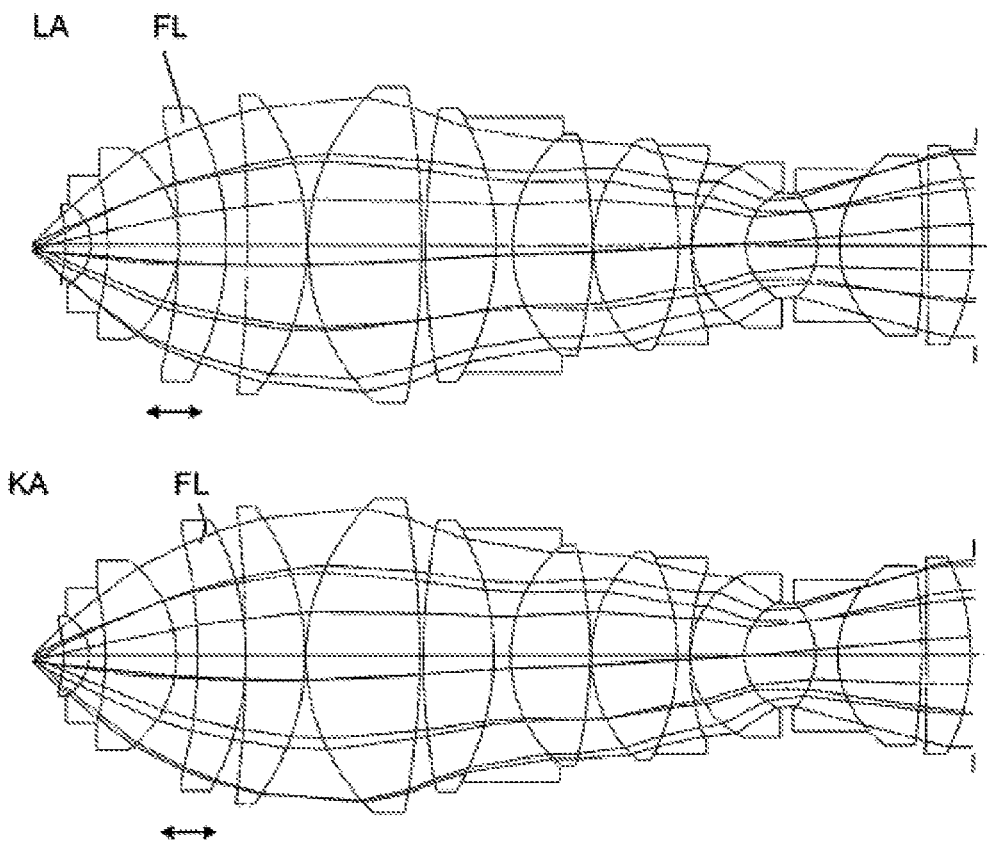
FIG. 11 shows schematic illustrations of the arrangement according to the invention in FIG. 9, for various focal depths in the sample.

FIG. 11 shows schematic illustrations of the arrangement in FIG. 9 for various focal depths in the sample, with a long working distance LA and a short working distance KA, and the axially movable focus lens FL.

Figure 12:
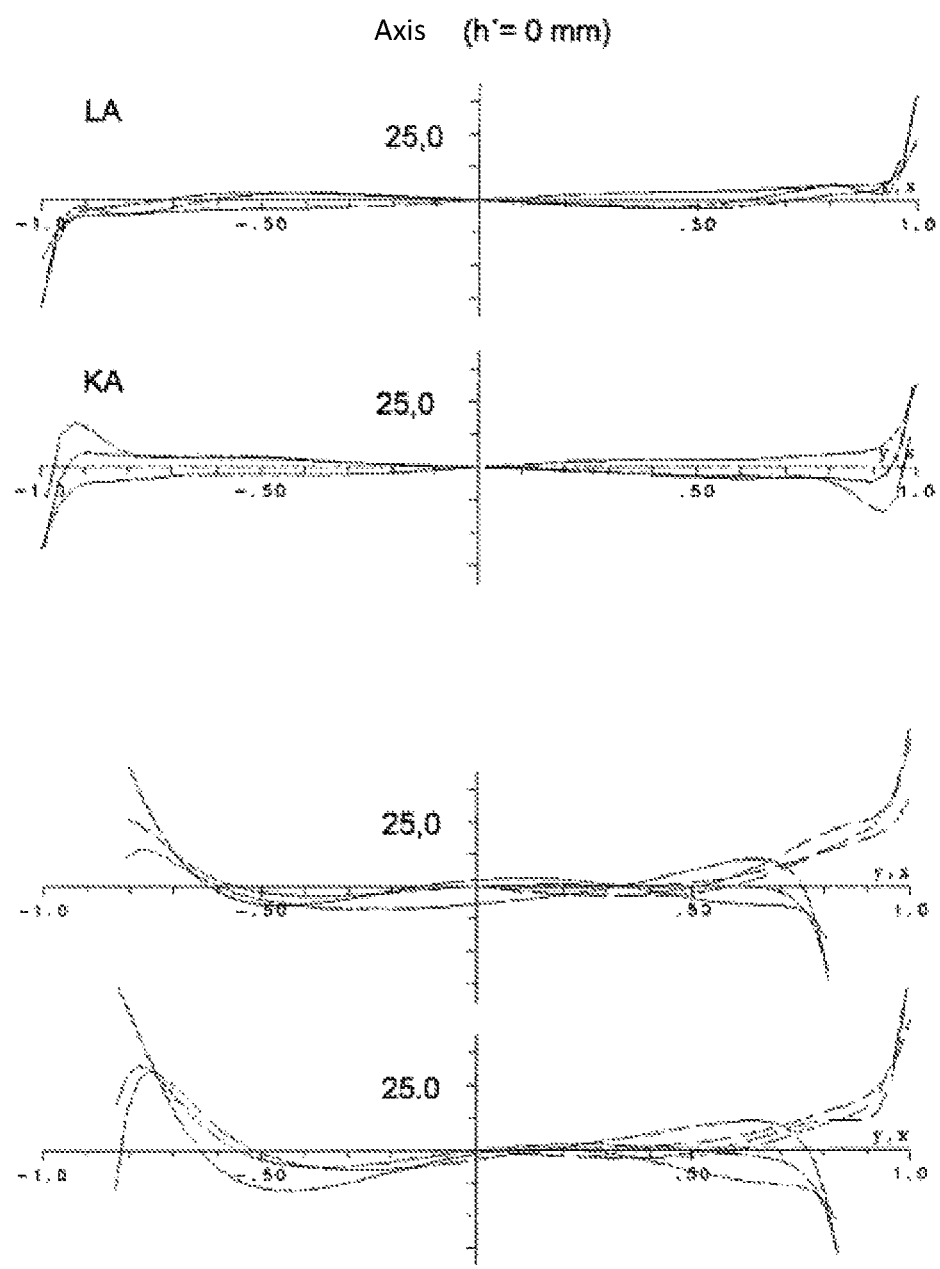
FIG. 12 shows schematic illustrations of transverse aberrations of the arrangement in FIG. 9.

FIG. 12 shows transverse aberrations in μm for an axis point h'=0 mm and for a field edge point h'=10 mm, using light of the wavelengths 546 nm, 644 nm, 480 nm and 830 nm for the various working distances LA and KA. Continuous lines refer to the meridional section, and dashed lines to the sagittal section.

The minimum changes in the transverse aberrations between the different working distances show, as above, the inventive function of the focusing arrangement.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

For purposes of interpreting the claims, it is expressly intended that the provisions of 35 U.S.C. §112(f) are not to be invoked unless the specific terms "means for" or "step for" are recited in a claim.

LIST OF REFERENCE NUMBERS

L1 to L15 lenses
r1 to r24 radii
D1 to D15 thicknesses
LA1 to LA8 air spaces
FL focus lens
FG frontal group
RG rear group
OE object plane
BE image plane
LA long working distance
KA short working distance
β magnification factor
P sample thickness
$n_e$ refractive index
$v_e$ Abbe coefficient

The invention claimed is:

1. An arrangement for changing the focus of a microscope objective comprising a plurality of optical components or component groups, wherein at least one of the optical components or component groups can move axially in an interior of the microscope objective, wherein the axially movable component or the axially movable component group includes a concave-convex lens or a lens group with a form factor according to the formula:

$$X = \frac{c_1 + c_2}{c_1 - c_2}$$

wherein X denotes the form factor, $c_1$ is the curvature of a surface of the concave-convex lens or lens group facing an object plane, and $c_2$ is the curvature of a surface of the concave-convex lens or lens group facing an image plane, and wherein X lies within a range from $-8<X<-1$, and wherein the concave-convex lens or lens group is arranged, proceeding from the object plane, behind a frontal group including first optical component or a component group, wherein a total focal length $f_{front}$ of the frontal group relative to a focal length $f_{objective}$ of the objective lies in the range of:

$$f_{front} < -4 \times f_{objective} \text{ or } f_{front} > 4 \times f_{objective}.$$

2. The arrangement for changing the focus of a microscope objective according to claim 1, wherein, for an axial range of travel of the concave-convex lens or lens group between 0 mm and 5 mm, the focal length f is within the range from:

$$3 \times f_{objective} < f_{ShiftLens} < 20 \times f_{objective}.$$

3. The arrangement for changing the focus of a microscope objective according to claim 1, wherein for a 25×/0.9 microscope objective, an immersion agent W including a sodium chloride solution, a focal range of 200 μm, a numerical aperture of 0.9, a magnification factor β with a 25× larger image, a field number of 18, and wherein r1 to r22 are the curvature radii of the optical components in mm, D is the thickness in mm, LA1 to LA6 are the air spaces between the optical components in mm, $n_e$ is the refractive index, and $v_e$ is the Abbe coefficient, the following design data characterizing the arrangement:

| Lens No. | Curvature radius r [mm] | Size Air space D, LA [mm] | Refractive index $n_e$ | Abbe coefficient $v_e$ |
|---|---|---|---|---|
| Sample, cell medium | flat | P | 1.38 | 63.0 |
| Cover glass | flat | DG | 1.53 | 54.3 |
| Immersion | flat | AA | 1.34 | 55.4 |
| 1 | flat | D1 0.50 | 1.49 | 70.2 |
| 2 | r1 −1.636 | D2 5.79 | 1.89 | 40.5 |
|  | r2 −6.167 | LA1 |  |  |
| 3 | r3 −14.549 | D3 2.40 | 1.59 | 61.0 |
|  | r4 −9.422 | LA2 |  |  |
| 4 | r5 70.312 | D4 3.00 | 1.81 | 46.2 |
|  | r6 −22.736 | LA3 |  |  |
| 5 | r7 42.712 | D5 3.80 | 1.49 | 84.1 |
| 6 | r8 −18.905 | D6 1.60 | 1.66 | 39.5 |
| 7 | r9 13.868 | D7 3.90 | 1.50 | 81.1 |
|  | r10 −18.518 | LA4 |  |  |
| 8 | r11 −344.203 | D8 1.40 | 1.64 | 42.2 |
| 9 | r12 8.092 | D9 5.04 | 1.53 | 76.6 |
|  | r13 −48.460 | LA5 0.35 |  |  |
| 10 | r14 8.015 | D10 3.80 | 1.59 | 61.0 |
| 11 | r15 11.802 | D11 1.40 | 1.72 | 53.6 |
|  | r16 5.902 | LA6 5.14 |  |  |
| 12 | r17 −6.704 | D12 4.69 | 1.81 | 46.2 |
|  | r18 −9.177 | 0.13 |  |  |
|  |  | 126.50 |  |  | and a tube lens is arranged behind the arrangement, the tube lens having a focal length f of f=164 mm.

4. The arrangement for changing the focus of a microscope objective according to claim 3, wherein the design data include the following air spaces LA1 to LA4 in mm, according to different variations between sample thicknesses P in mm, cover glass thicknesses DG in mm, and immersions W with the thicknesses AA in mm:

| P [mm] | DG [mm] | AA [mm] | LA1 [mm] | LA2 [mm] | LA3 [mm] | LA4 [mm] |
|---|---|---|---|---|---|---|
| 0 | 0 | 0.56 | 1.78 | 0.49 | 2.47 | 0.3 |
| 0.2 | 0 | 0.56 | 0.95 | 1.33 | 2.47 | 0.3 |
| 0 | 0.17 | 0.4 | 1.78 | 0.49 | 1.93 | 0.84 |
| 0.2 | 0.17 | 0.4 | 0.95 | 1.33 | 1.93 | 0.84. |

5. The arrangement for changing the focus of a microscope objective according to claim 1, wherein for a 25×/0.8 microscope objective, immersion agent W including a sodium chloride solution, a focal range of 250 μm, a numerical aperture of 0.8, a magnification factor β with a 25× larger image, a field number of 18, and wherein r1 to r17 are the curvature radii of the optical components in mm, D is the thickness in mm, LA1 to LA7 are the air spaces between the optical components in mm, $n_e$ is the refractive index, and $v_e$ is the Abbe coefficient, the following design data characterizing the arrangement:

| Lens No. | Curvature radius [mm] | Size [mm] | Refractive index $n_e$ | Abbe coefficient $v_e$ |
|---|---|---|---|---|
| Sample, water | flat | P | 1.33 | 55.8 |
| Cover glass | flat | 017 | 1.52 | 59.2 |
| Immersion | flat | 060 | 1.33 | 55.8 |
| 1 | flat | D1 0.50 | 1.49 | 70.2 |
| 2 | r1 −1.654 | D2 4.99 | 1.89 | 40.5 |
|  | r2 −5.733 | LA1 |  |  |
| 3 | r3 −16.879 | D3 1.50 | 1.52 | 64.0 |
|  | r4 −7.899 | LA2 |  |  |
| 4 | r5 15.656 | D4 2.00 | 1.59 | 68.0 |
|  | r6 34.321 | LA3 1.65 |  |  |
| 5 | r7 10.519 | D5 4.50 | 1.55 | 45.5 |
|  | r8 9.906 | LA4 2.30 |  |  |
| 6 | r9 −43.509 | D6 1.10 | 1.64 | 42.2 |
| 7 | r10 9.045 | D7 5.00 | 1.53 | 76.6 |
|  | r11 −13.679 | LA5 0.10 |  |  |
| 8 | r12 23.291 | D8 5.80 | 1.53 | 76.6 |
| 9 | r13 −7.743 | D9 1.10 | 1.62 | 44.3 |
|  | r14 393.143 | LA6 0.36 |  |  |
| 10 | r15 10.029 | D10 6.85 | 1.82 | 46.4 |
|  | r16 6.941 | LA7 4.20 |  |  |
| 11 | r17 −6.809 | D11 2.83 | 1.60 | 35.0 |
|  | r18 −7.687 | 0.15 |  |  |
|  |  | 126.50 |  |  | and a tube lens arranged behind the arrangement, the tube lens having a focal length f of f=164 mm.

6. The arrangement for changing the focus of a microscope objective according to claim 5, wherein the design data include the following air spaces LA1 to LA2 in mm, according to various sample thicknesses P in mm:

| P [mm] | LA1 [mm] | LA2 [mm] |
|---|---|---|
| 0 | 1.42 | 1.19 |
| 0.25 | 0.50 | 2.11. |

7. The arrangement for changing the focus of a microscope objective according to claim 1 wherein, for a 20×/1.0 microscope objective, immersion agent W including a sodium chloride solution, a focal range of 300 μm, a numerical aperture of 1.0, a magnification factor β with a 20× larger image, and a field number of 20, and wherein r1 to r24 are the curvature radii of the optical components in mm, D is the thickness in mm, LA1 to LA8 are the air spaces between the optical components in mm, $n_e$ is the refractive index, and $v_e$ is the Abbe coefficient, the following design data characterizing the arrangement:

| Lens No. | Curvature radius [mm] | Size [mm] | Refractive index $n_e$ | Abbe coefficient $v_e$ |
|---|---|---|---|---|
| Sample, water | flat | P | 1.34 | 55.4 |
| immersion | flat | 2.62 | 1.34 | 55.4 |
| 1 | r1 −11.117 | D1 2.20 | 1.63 | 53.0 |
| 2 | r2 −3.919 | D2 1.41 | 1.76 | 52.1 |
| 3 | r3 −21.906 | D3 6.00 | 1.89 | 40.5 |
|  | r4 −10.061 | LA1 |  |  |
| 4 | r5 −41.589 | D4 4.00 | 1.73 | 28.3 |
|  | r6 −24.293 | LA2 |  |  |
| 5 | r7 −104.081 | D5 5.00 | 1.44 | 94.5 |
|  | r8 −21.109 | LA3 0.10 |  |  |
| 6 | r9 18.565 | D6 9.65 | 1.44 | 94.5 |
|  | r10 −72.224 | LA4 0.37 |  |  |
| 7 | r11 60.934 | D7 6.00 | 1.44 | 94.5 |
| 8 | r12 −22.685 | D8 1.50 | 1.75 | 35.1 |
| 9 | r13 12.541 | D9 6.79 | 1.44 | 94.5 |
|  | r14 −36.716 | LA5 0.10 |  |  |
| 10 | r15 12.363 | D10 7.20 | 1.44 | 94.5 |
| 11 | r16 −19.563 | D11 1.10 | 1.64 | 42.2 |
|  | r17 20.125 | LA6 0.10 |  |  |
| 12 | r18 7.723 | D12 4.50 | 1.82 | 46.4 |
|  | r19 5.002 | LA7 6.00 |  |  |
| 13 | r20 −6.689 | D13 1.90 | 1.52 | 52.1 |
| 14 | r2 9.342 | D14 7.07 | 1.53 | 76.6 |
|  | r22 −57.991 | LA8 0.45 |  |  |
| 15 | r23 −455.522 | D15 3.80 | 1.75 | 35.0 |
|  | r24 −18.748 | 0.29 |  |  |
|  |  | 107.00 |  |  | and a tube lens is arranged behind the arrangement, the tube lens having a focal length f of f=164.5 mm.

8. The arrangement for changing the focus of a microscope objective according to claim 7, wherein the design data include the following air spaces LA1 to LA2 in mm, according to various sample thicknesses P in mm:

| P [mm] | LA1 [mm] | LA2 [mm] |
|---|---|---|
| 0 | 1.8 | 0 |
| 0.29 | 0 | 1.8. |

\* \* \* \* \*